(12) United States Patent
Ishii (10) Patent No.: US 9,277,112 B2
(45) Date of Patent: Mar. 1, 2016

(54) AUTO FOCUSING APPARATUS AND AUTO FOCUSING METHOD, AND IMAGE SENSING APPARATUS

(71) Applicant: CANON KABUSHIKI KAISHA, Tokyo (JP)

(72) Inventor: Kazunori Ishii, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/940,939

(22) Filed: Jul. 12, 2013

(65) Prior Publication Data

US 2013/0300908 A1 Nov. 14, 2013

Related U.S. Application Data

(63) Continuation of application No. 13/653,724, filed on Oct. 17, 2012, now Pat. No. 8,497,929, which is a continuation of application No. 12/579,984, filed on Oct. 15, 2009, now Pat. No. 8,330,849.

(30) Foreign Application Priority Data

Oct. 22, 2008 (JP) ................................ 2008-272349

(51) Int. Cl.
    *H04N 5/232* (2006.01)
(52) U.S. Cl.
    CPC ....... *H04N 5/23212* (2013.01); *H04N 5/23219* (2013.01)

(58) Field of Classification Search
    CPC .................. H04N 5/23219; H04N 5/23212
    USPC .................... 348/208.14, 222.1, 349
    See application file for complete search history.

(56) References Cited

U.S. PATENT DOCUMENTS

| 8,098,903 | B2 * | 1/2012 | Fukushi | 382/118 |
| 2008/0193115 | A1 * | 8/2008 | Uenishi | 348/349 |
| 2008/0285791 | A1 * | 11/2008 | Suzuki et al. | 382/100 |
| 2013/0258169 | A1 * | 10/2013 | Yasuda | 348/349 |

FOREIGN PATENT DOCUMENTS

| JP | 2007-034261 A | 2/2007 |
| JP | 2007-065290 A | 3/2007 |
| JP | 2008-175995 A | 7/2008 |
| JP | 2008-193411 A | 8/2008 |
| JP | 2008-197286 A | 8/2008 |
| JP | 2009-003003 A | 1/2009 |

OTHER PUBLICATIONS

Aug. 2, 2013 Japanese Office Action that issued in Japanese Patent Application No. 2008-272349.
The above reference was cited in a Feb. 6, 2015 Japanese Office Action, that issued in Japanese Patent Application No. 2014-070074.

* cited by examiner

*Primary Examiner* — Gevell Selby
(74) *Attorney, Agent, or Firm* — Cowan, Liebowitz & Latman, P.C.

(57) ABSTRACT

When a face is detected from image signals, stability determination time is set for determining if the face is recognized in a stable manner, and a period of time for which the face is consecutively detected starts to be measured. Until the measured period of time exceeds the stability determination time, an AF evaluation value acquired from a normal frame set to include a face frame corresponding to the face is used to exercise TV-AF control. Once the measured time exceeds the stability determination time, TV-AF control is exercised based on AF evaluation values acquired from each of the face frame and the normal frame.

54 Claims, 7 Drawing Sheets

AUTO FOCUSING APPARATUS AND AUTO FOCUSING METHOD, AND IMAGE SENSING APPARATUS

CROSS-REFERENCE TO RELATED APPLICATIONS

This application is a continuation of application Ser. No. 13/653,724, filed Oct. 17, 2012, which is a continuation of application Ser. No. 12/579,984, filed Oct. 15, 2009, now U.S. Pat. No. 8,330,849, the entire disclosures of which are hereby incorporated by reference.

BACKGROUND OF THE INVENTION

1. Field of the Invention

The present invention relates to an auto focusing apparatus and method preferred for use in the case of automatic focusing for shooting, and to an image sensing apparatus, and more particularly, relates to an auto focusing apparatus and method preferred for use in the case of extracting a feature portion (in particular, a face portion) of a person and exercising focusing control on the basis of the result, and to an image sensing apparatus.

2. Description of the Related Art

In autofocus (AF) control for video cameras, etc., a TV-AF method is a primary method, in which an AF evaluation value signal is generated which represents the sharpness (contrast) of image signals generated using an image sensor, and the position of a focus lens is searched such that the AF evaluation value signal reaches its peak value.

The autofocus control based on the sharpness of video signals may, for example, in the case of photographing a person, fail to focus on the person and focus on the background instead, because of the relationship in contrast between the person as a main subject and its background.

In order to solve this problem, a technique has been developed in which autofocus control is carried out using the result of face recognition in an image sensing apparatus provided with a face recognition function for recognizing a face included in an image with image signals. For example, Japanese Patent Laid-Open No. 2006-227080 discloses a technique in which a focus detection area including a recognized face region is set to carry out focus detection. Furthermore, Japanese Patent Laid-Open No. 2001-215403 discloses a technique of detecting eyes of a person and carrying out focus detection on the basis of the detected eyes.

As it happens, in the case of focus detection using the face recognition function described above, focusing control for recognized faces is constantly carried out. For example, in order to focus on a face recognized by the face recognition function, a focus detection area is set to correspond to the position of the recognized face. In a case in which no face has been recognized, a focus detection area is set in a predetermined fixed position within a shot image such as, for example, in the center position of a shot image. On the basis of an AF evaluation value generated from image signals in the focus detection area, focusing control is carried out.

In a case in which the main subject is a person (hereinafter referred to as a main person), there is a possibility that face recognition will be difficult depending on the influence of change in composition or the influence of camera shake of the photographer, and it is not always true that a face is constantly recognized. In particular, in the case of shooting moving images, the main person is often moving, and the camera will thus fail in face recognition even if the camera has succeeded in face recognition in the last minute, in a case in which the main person looks away or another subject temporarily obscures the main person.

If the state in which a face is recognized and the state in which the camera has failed in face recognition alternate frequently within a short interval when the face actually exits in the same position within a shot image, it will be difficult to determine where to focus. In this case, there is a problem that there is a possibility that focusing control will be unable to be carried out in a stable manner, such as slower focusing operation for a main person desired by the photographer or the inability to carry out focusing.

SUMMARY OF THE INVENTION

The present invention has been made in consideration of the above situation, and allows focus detection to be carried out in a stable manner when photographing a person.

According to the present invention, provided is an auto focusing apparatus comprising: a detection unit configured to detect a subject from image signals periodically supplied; a setting unit configured to set a first frame corresponding to the subject detected by the detection unit and a second frame which is different from the first frame; and a focusing unit configured to acquire a focus signal based on image signals in at least one of the first and second frames, and exercise focusing control of a photographing optical system based on the focus signal, wherein the focusing unit exercises focusing control using a focus signal in the first frame depending on a frequency of detection for the subject from the image signals by the detection unit.

According to the present invention, provided is an auto focusing method comprising: a detection step of detecting a subject from image signals periodically supplied; a setting step of setting a first frame corresponding to the detected subject and a second frame which is different from the first frame; and a focusing step of acquiring a focus signal based on image signals in at least one of the first and second frames, and exercising focusing control of a photographing optical system based on the focus signal, wherein the focusing step exercises focusing control using a focus signal in the first frame depending on a frequency of detection for the subject from the image signals in the detection step.

Further features of the present invention will become apparent from the following description of exemplary embodiments (with reference to the attached drawings).

DESCRIPTION OF THE EMBODIMENTS

Preferred embodiments of the present invention will be described in detail in accordance with the accompanying drawings.

Figure 1:
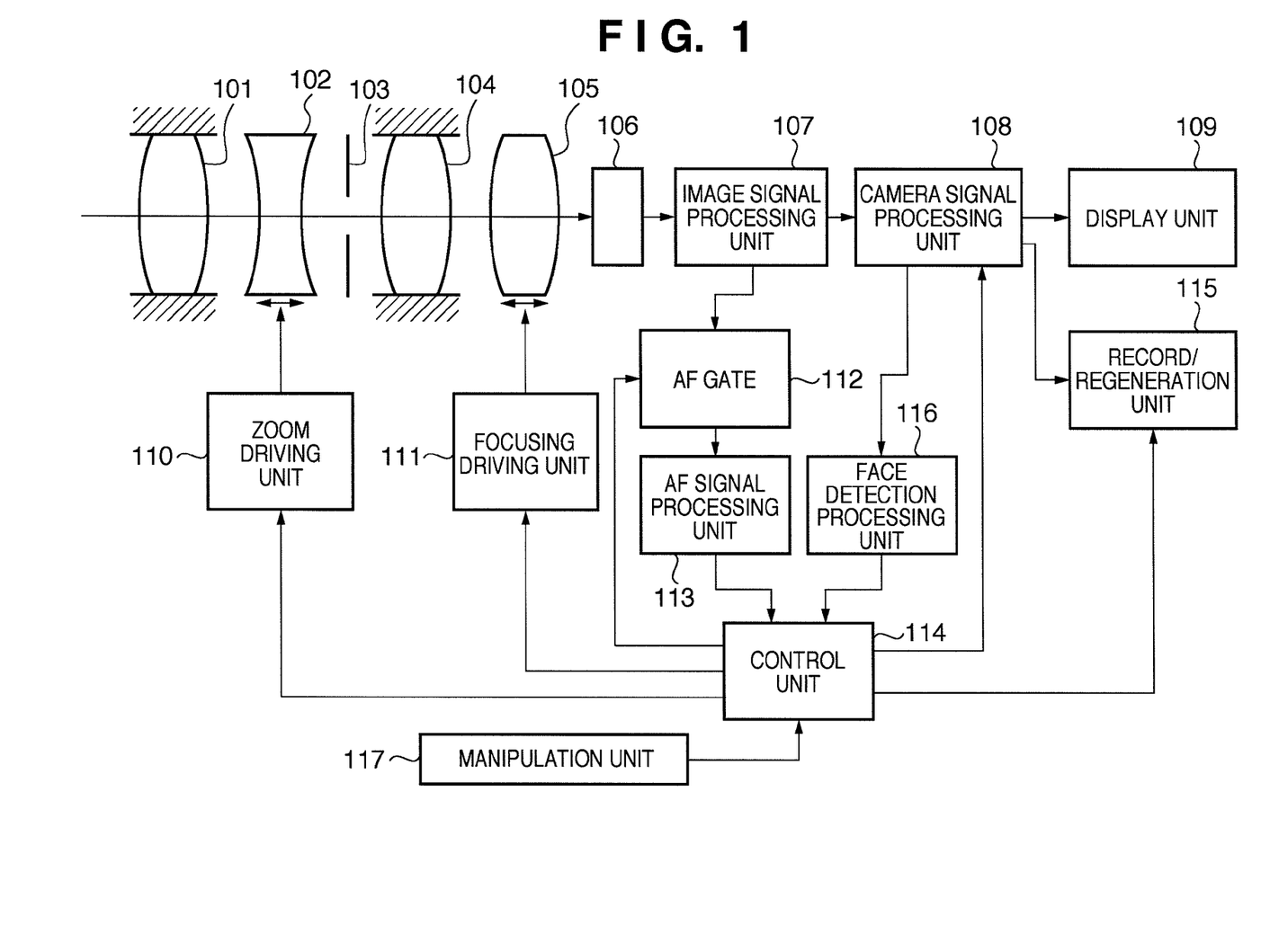
FIG. 1 is a block diagram illustrating a configuration example of a digital video camera which is applicable to embodiments according to the present invention.

FIG. 1 shows a configuration example of a digital video camera 100 which is applicable to embodiments of the present invention. This digital video camera 100 is provided with an auto focusing function for carrying out auto focusing according to the present invention.

In FIG. 1, a first group of fixed lenses 101, a zoom lens 102, an aperture 103, a second group of fixed lenses 104, and a focus compensator lens (hereinafter, focus lens) 105 constitute a photographing optical system. The zoom lens 102 moves in the direction of the optical axis to change the zoom magnification. The focus lens 105 has a combination of a function of correcting the movement of a focal plane accompanying the change in zoom magnification brought about by the zoom lens 102, and a focusing function.

An image sensor 106, which may be an element such as a CCD sensor or a CMOS sensor, converts by photoelectric conversion incident light into image signals which are electrical signals and outputs the image signals. The image sensor 106 carries out reading of electric charges from pixels and exercises shutter control, in accordance with a variety of timing signals supplied from a timing generator, not shown. Continuous reading of electric charges from the image sensor 106 at a predetermined time interval, for example, a field cycle or a frame cycle, can obtain image signals which are updated for each field cycle or frame cycle, allowing moving images to be shot.

An image signal processing unit 107 includes a correlated double sampling (CDS) unit for sampling the output of the image sensor 106, an automatic gain controller (AGC) for carrying out gain adjustment, and an analog-digital (A/D) conversion unit for converting analog image signals into digital image signals. A camera signal processing unit 108 applies various types of image processing to output signals from the image signal processing unit 107 to generate video signals. In addition, the camera signal processing unit 108 applies, to the generated video signals, compression coding in a predetermined compression coding format such as a MPEG2 format or a H.264|AVC format to generate compressed video signals.

Furthermore, the camera signal processing unit 108 can generate, on the basis of a display control signal supplied from a control unit 114 described below, video signals for displaying video according to the display control signal. The camera signal processing unit 108 can combine video signals based on this display control signal with video signals based on the image signals from the image sensor 106 supplied from the image signal processing unit 107, and output the combined signals. This allows video based on the image signals to be combined with a predetermined message or frame indication and then displayed.

A display unit 109 is composed of, for example, a display device such as an LCD and a driving unit for driving the display device, and displays video signals generated by the camera signal processing unit 108. A record/regeneration unit 115 records the compressed video signals output from the camera signal processing unit 108 onto a record medium such as a magnetic tape, an optical disc, or a semiconductor memory, and plays back the compressed video signals recorded on the record medium.

An AF gate 112 selectively passes only signals in a region for use in focus detection from among output signals from all of the pixels of the image sensor 106 supplied from the image signal processing unit 107 on the basis of information supplied from the control unit 114 described below. Hereinafter, the frame surrounding the region for use in focus detection is referred to as an AF frame.

An AF signal processing unit 113 extracts a high-frequency component through band-pass filter processing, from among signals passing through the AF gate 112, that is, signals in the AF frame. The AF signal processing unit 113 generates, from the extracted high-frequency signals, a luminance difference component that is the difference between the maximum and minimum values of the luminance levels of the signals passing through the AF gate 112. Then, a focus signal is generated from the luminance difference component. In practice, the focus signal herein refers to a signal which represents the sharpness (contrast) of video generated on the basis of output signals from the image sensor 106. Since this sharpness varies depending on the focus state of the photographing optical system, the signal representing the sharpness is used as an AF evaluation value for evaluating the focus state of the photographing optical system.

A face detection processing unit 116 applies known face recognition processing to video signals supplied from the camera signal processing unit 108 to detect a face region (a face) of a person in a sensed image. The face detection processing unit 116 carries out face recognition processing on a predetermined cycle such as, for example, one frame cycle or several frame cycle. The result of detecting the face region by the face detection processing unit 116 is supplied to the control unit 114 described below.

It is to be noted that, as known face recognition processing which is applicable to the face detection processing unit 116, for example, a method is known of extracting a flesh-colored region from among grey scale colors for each pixel represented by image data and detecting a face by matching with a previously prepared contour plate of the face. In addition, a method is also well known in which face detection is carried out by extracting a feature point of a face such as eyes, a nose, or a mouth using a well known pattern recognition technique. Furthermore, approaches for the face recognition processing, which are applicable to the present invention, are not limited to these approaches described above, and other approaches may be used.

A zoom driving unit 110 includes an actuator for moving the zoom lens 102 and a driver for the actuator. A focusing driving unit 111 includes an actuator for moving the focus lens 105 and a driver for the actuator. The actuators of the zoom driving unit 110 and focusing driving unit 111 are each composed of a motor such as a stepping motor, a DC motor, an oscillating motor, and a voice coil motor.

The control unit 114 has, for example, a CPU, a ROM, and a RAM, and the CPU uses the RAM as a working memory to control the operation of the entire digital video camera 100, in accordance with a program stored in advance in the ROM. The control unit 114 further has a nonvolatile memory, and stores in the nonvolatile memory operations for a manipulation unit 117 described below, set values set by other processing, etc.

In addition, the control unit 114 transmits information to the AF gate 112 so as to add as the region for use in focus detection a location containing the face region in the sensed image, on the basis of the result of detecting the face region by the face detection processing unit 116. In addition, the control unit 114 controls the focusing driving unit 111 to drive the focus lens 105 on the basis of output signals from the AF signal processing unit 113, thereby exercising focusing control.

Furthermore, the control unit 114 can set the shutter speed of the image sensor 106. For example, the control unit 114 can set the shutter speed on the basis of image signals output from the image sensor 106, the state of the aperture 103, etc., and achieve an electronic shutter function by controlling the timing generator, not shown, so as to output a timing signal corresponding to the set shutter speed. Moreover, the control unit 114 has a timer function for measuring time. Furthermore, the control unit 114 generates the display control signal described above in accordance with a program, and supplies the display control signal to the camera signal processing unit 108.

The manipulation unit 117 is provided with a plurality of manipulators which receive user operations, and outputs to the control unit 114 control signals according to operations for the manipulators. For example, operations for the manipulation unit 117 allow commands such as power ON/power OFF, start and end of shooting, and zooming in the digital video camera 100.

First Embodiment

Figure 2:
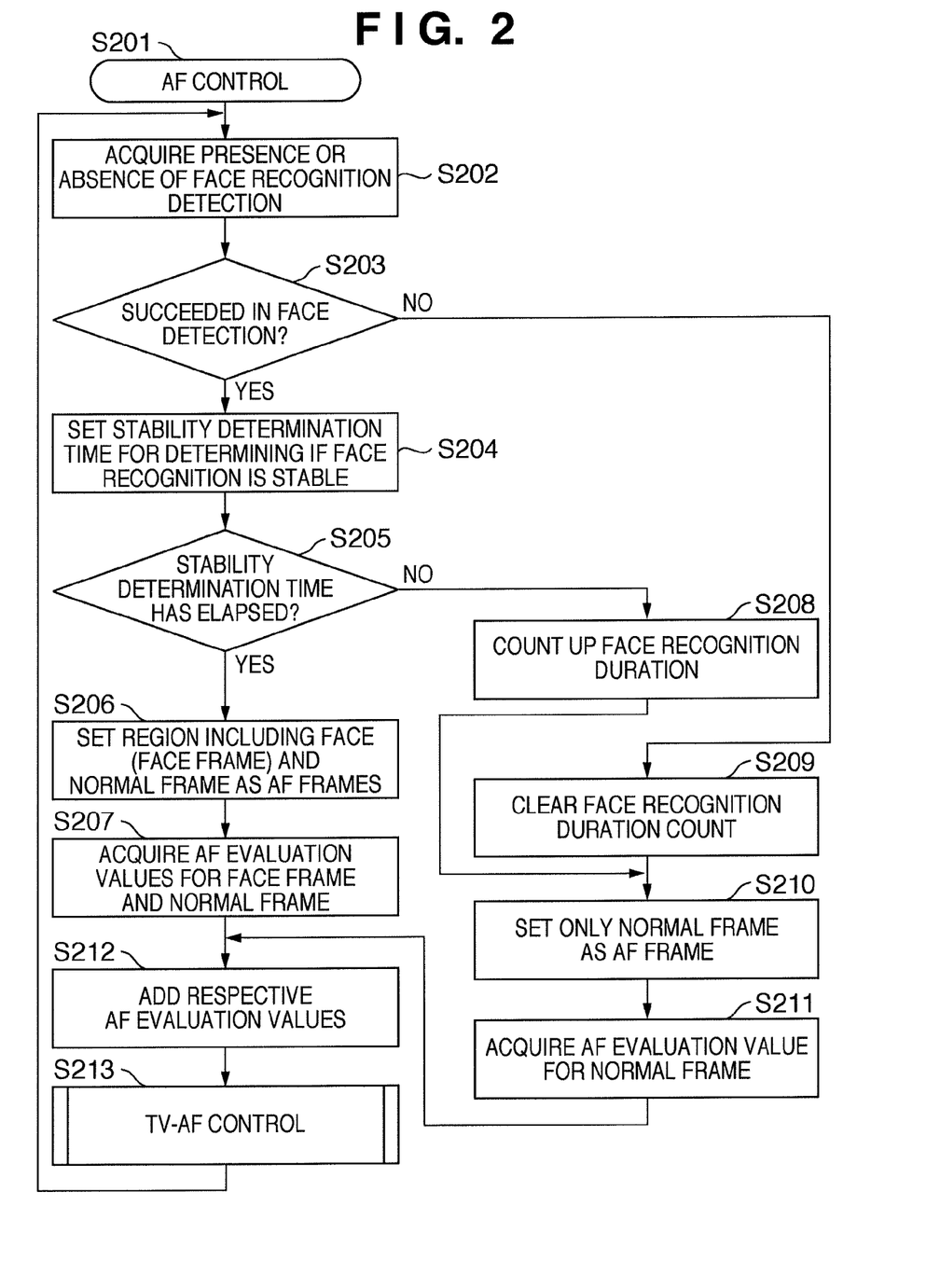
FIG. 2 is a flowchart showing an example of TV-AF control according to a first embodiment of the present invention.

Next, an example of TV-AF control according to a first embodiment of the present invention will be described with reference to a flowchart of FIG. 2. Each process in the flowchart of FIG. 2 is executed by a CPU in the control unit 114 in accordance with a program stored previously in the ROM.

In step S201, the control unit 114 starts the processing. The processing in accordance with this flowchart exemplified in FIG. 2 is executed repeatedly, for example, on a reading cycle for image signals from the image sensor 106 for generating an image for one field.

In step S202, the control unit 114 acquires the presence or absence of a recognized face, as a result of executing face recognition processing on a latest shot image in the face detection processing unit 116. Then, in the next step S203, it is determined whether or not to have succeeded in face recognition on the basis of the presence or absence of a face acquired in step S202. If it is determined that the processing has succeeded in face recognition, the processing proceeds to step S204.

In step S204, a stability determination time is set which is a threshold for determining whether or not a face is consecutively recognized in a stable manner. The stability determination time is set, for example, with a repeat cycle of the flowchart of FIG. 2. Then, in the next step S205, it is determined whether or not the time elapsing from the face recognition exceeds the stability determination time set in step S204. More specifically, in step S205, it is determined whether or not face recognition duration counted up in step S208 described below exceeds the stability determination time. If it is determined that the face recognition duration exceeds the stability determination time, the processing proceeds to step S206.

In step S206, the control unit 114 sets, for the AF gate 112, a predetermined AF frame which moves following a subject including a face region and a predetermined AF frame which does not follow the subject, on the basis of positional information on the image from which the face is recognized by the face recognition processing in the face detection processing unit 116. As the positional information, information on the center position of the region from which the face is recognized or information representing the position of a feature point of the face such as eyes, a nose, or a mouth may be used.

It is to be noted hereinafter that the "predetermined AF frame which moves following a subject including a face region" is referred to as a "face frame", whereas the "predetermined AF frame which does not follow the subject" is referred to as a "normal frame".

As an example of the setting method for the normal frame in step S206, a fixed frame is here set centering on the center of the image including the face frame. In addition, the number of normal frames is not limited to one on the image, and a plurality of normal frames may be present. In such a case, at least one normal frame is set to have a size capable of including the face frame.

It is to be noted that when the face frame and the normal frame are set in step S206, an indication representing the set face frame can be displayed on the display unit 109. As an example, the control unit 114 generates a display control signal for an indication representing the face frame, for example, a frame border indication representing the boundary of the face frame, and supplies the display control signal to the camera signal processing unit 108. The camera signal processing unit 108 generates video signals for the frame indication on the basis of the display control signal, combines the video signals with image signals supplied from the image signal processing unit 107, and outputs the combined signals to the display unit 109. Thus, the sensed image with the face frame indicated thereon is displayed on the display unit 109, thereby allowing the photographer to easily know which portion of the sensed image attention is currently paid to for carrying out focusing.

It is to be noted that the indication representing the face frame is not limited to the frame border indication. For example, a region in the face frame may be indicated by changing the luminance or chromaticity in the face frame. In addition, while an explanation has been given here to indicate only the face frame, an indication representing the normal frame may be further displayed in addition to the face frame indication. In this case, for example, some distinction in the color of the frame border may be made, so as to be able to easily distinguish between the indication representing the normal frame and the indication representing the face frame.

In the next step S207, the control unit 114 acquires from the AF signal processing unit 113 AF evaluation values for each of the face frame and the normal frame, and the processing proceeds to step S212. In step S212, the AF evaluation values acquired from each set AF frame are added to generate an AF evaluation value mainly for use in a case in which focusing control is exercised in accordance with TV-AF processing.

By the way, in particular, while shooting moving images, it is conceivable that subjects other than a main subject, including but not limited to a person, may often appear in the image during shooting. Now, think about in a case in which the AF evaluation value for the face frame is treated in the same way as the AF evaluation value for the normal frame to exercise focusing control. In general, a person's face has a low contrast, from which a sufficient AF evaluation value is not likely to be obtained. Therefore, depending on the configuration of a subject, even if a face frame is set by face detection, the face frame may be affected by an evaluation value for the normal frame to come into focus on the background. Thus, focusing control may be exercised on an undesired subject for the photographer, resulting in a temporarily unstable focusing state.

In order to avoid such a situation, it is conceivable that the AF evaluation value acquired from the face frame is subjected to weighting and then added, as a method for adding AF evaluation values acquired from each set AF frame. Carrying out weighting for the AF evaluation value acquired from the face frame allows the photographer to easily carrying out focusing on a main person subject desired by the photographer.

Besides this, the weighting ratio of the face frame may be changed depending on positional information on the image from which a face is recognized by the face recognition processing in the face detection processing unit 116. For example, the weighting is increased in a case in which a face is detected near the center of the image, while the weighting is reduced in a case in which the face is detected near the edge of the image. Since it is believed that photographers often take images while arranging a main person subject near the center of the image, carrying out the weighting according to the position of the face on the image allows focusing on a main person subject desired by the photographer to be easily carried out.

In step S213, the AF evaluation value generated in step S212 is used to execute TV-AF processing. This TV-AF processing can use known techniques, for example, in order for the AF evaluation value to reach its peak value, the focus lens 105 is driven while monitoring the AF evaluation value, thereby resulting in an in-focus state. The TV-AF processing also involves processing for keeping the in-focus state, such as processing for determining whether or not the AF evaluation value is decreased, in order to determine if it is necessary to drive the focus lens again after obtaining the in-focus state. Then, the processing is returned to step S202.

If it is determined in step S205 described above that the stability determination time has not elapsed after the face recognition, the processing proceeds to step S208. In step S208, the face recognition duration is counted up. Further, in step S203 described above, if it is determined that the step has failed to carry out face recognition, the processing proceeds to step S209, in which the face recognition duration is cleared. After the face recognition duration is counted up in step S208 or the face recognition duration is cleared in step S209, the processing proceeds to step S210.

In step S210, the control unit 114 sets, for the AF gate 112, only the normal frame as an AF frame. In a case in which an indication representing the face frame is displayed on the display unit 109 when the face frame is set in step S206 described above, the indication representing the face frame is erased in this step. Then, in the next step S211, an AF evaluation value is acquired from the normal frame, and the processing proceeds to step S212.

More specifically, in the first embodiment, in not only a case in which face recognition has failed, but also a case in which the face has been recognized, TV-AF control will be exercised using only the normal frame as an AF frame, until the predetermined time (stability determination time) elapses after the face is recognized.

In a case in which the step S203 succeeds in face recognition and the processing proceeds to the step S210 while the face recognition duration does not exceed the stability determination time in step S205, the processing has not passed through step S206, with the result that no face frame is set. In this case, it is conceivable to estimate the region of a face frame on the basis of a face obtained by face recognition processing and set a normal frame so as to include the estimated region of the face frame. Alternatively, it is conceivable to previously specify a region in which a face obtained by face recognition processing is present in an image, and when a face frame is set, to set a normal frame of a size in which the region of the face frame will be included.

As described above, in the first embodiment according to the present invention, it is determined whether or not a face remains recognizable until the predetermined time elapses, without setting a face frame as an AF frame immediately after the face is recognized. Then, if it is determined that the face remains recognizable after the elapse of predetermined time, a face frame will be set along with a normal frame, both as AF frames.

This prevents the AF frame from being switched frequently in such a case that the state in which a face is recognized and the state in which no face is recognized alternate frequently. Therefore, it is possible to alleviate the situation in which it becomes impossible to exercise focus detection control in a stable manner due to the inability to specify a subject to be subjected to focusing.

In particular, while shooting moving images, a main person subject is likely to be moving often, and it is assumed that the step fails to recognize a face more frequently, such as when the main person frequently looks away, or another subject temporarily obscures the main person. The first embodiment according to the present invention is effective in such as case, and can achieve more stable focusing control.

<Stability Determination Time for Determining the Stability of Face Recognition>

While the stability determination time for determining the stability of face recognition, which is set in step S204, has been described in the foregoing as time set in a fixed manner, how to set the stability determination time is not limited to this example. For example, the stability determination time can be set depending on the focal length of the photographing optical system.

This arises from the fact that the longer the focal length is, that is, the closer the focus is to the telephoto side, the more easily camera shake produces effects. Thus, less stable image can be obtained as compared with the wide-angle side. Therefore, the longer the focal length is, the more the reliability in connection with face recognition is decreased, and the more the probability of reliable recognition as a face is decreased. Thus, it is conceivably often the case that a face is not recognized in a stable manner. Accordingly, when the stability determination time is set as a longer period of time as the focal length is longer, focusing control can be exercised in a stable manner for a recognized face.

Figure 3:
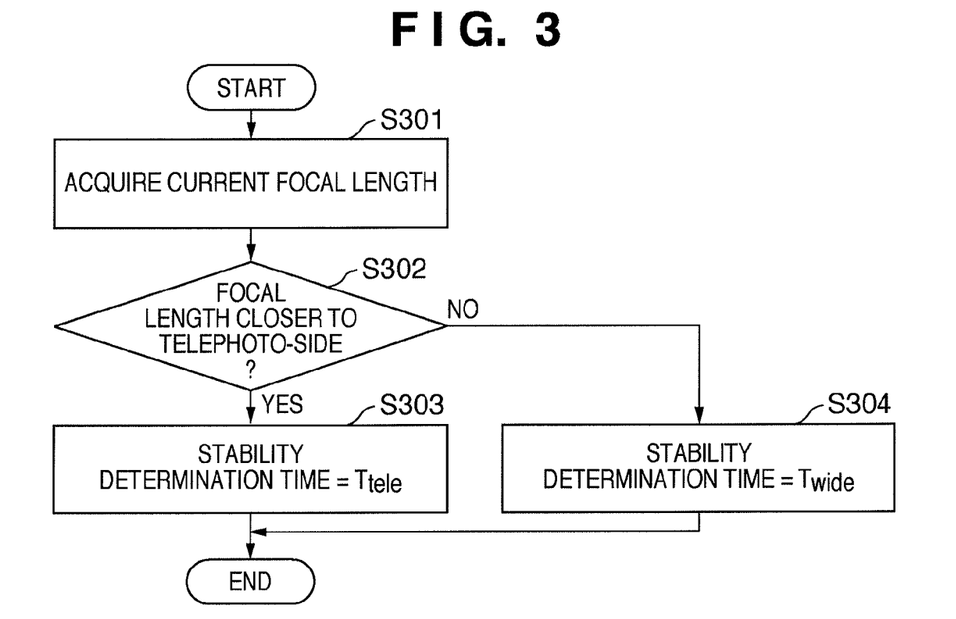
FIG. 3 is a flowchart showing an example of processing in which stability determination time is set depending on focal length.

An example of processing for setting the stability determination time depending on the focal length will be described with reference to a flowchart of FIG. 3. In step S301, the control unit 114 acquires a current focal length in the photographing optical system. For example, the control unit 114 can acquire the focal length of the photographing optical system, on the basis of drive information on the zoom driving unit 110 and the focusing driving unit 111. Then, it is determined in the next step S302 whether or not the focal length is greater than a reference value.

If it is determined in step S302 that the focal length is greater than the reference value, that is, closer to the telephoto side at present, the processing proceeds to step S303. Then, in step S303, the time $T_{tele}$ which is applied in a case in which the focal length is closer to the telephoto side, is set as the stability determination time which is set in step S204. On the other hand, if it is determined in step S302 that the focal length is less than the reference value, that is, closer to the wide-angle side than at present, the processing proceeds to step S304. Then, in step S304, the time $T_{wide}$, which is applied in a case in which the focal length is closer to the wide-angle side and is shorter than the $T_{tele}$ applied in a case in which the focal length is closer to the telephoto side, is set as the stability determination time which is set in step S204. It is to be noted that the values set in step S303 and step S304 described above are each previously determined. This allows focusing control to be exercised in a stable manner, regardless of the focal length.

While it is determined here that the focal length is closer to the telephoto side or the wide-angle side than the reference value, the present invention is not limited to this example, and the focal length may be determined more minutely in such a way that the stability determination time according to the focal length thus determined may be selected.

Furthermore, as another example, the stability determination time can be set depending on the shutter speed for shooting. The slower the shutter speed is, the more easily camera shake produces effects, with the result that stable video is less likely to be obtained. Therefore, the slower the shutter speed is, the more the reliability in connection with face recognition is decreased as well, and the more the probability of reliable recognition as a face is decreased. Therefore, it is conceivably often the case that a face is not recognized in a stable manner. Accordingly, when the stability determination time is set as a longer period of time as the shutter speed is slower, focusing control can be exercised in a stable manner for a recognized face.

Figure 4:
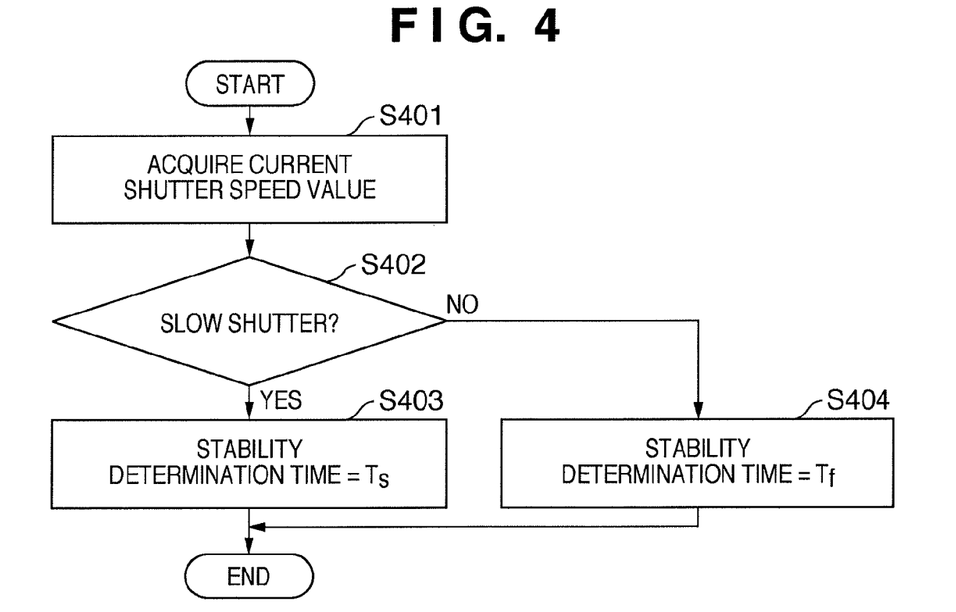
FIG. 4 is a flowchart showing an example of processing in which stability determination time is set depending on shutter speed.

An example of processing for setting the stability determination time depending on the shutter speed will be described with reference to a flowchart of FIG. 4. In step S401, the control unit 114 acquires a current shutter speed, and it is then determined in the next step S402 whether or not the acquired shutter speed is a slow shutter. For example, it is conceivable that the shutter speed is compared with a predetermined value to determine whether or not the shutter speed is a slow shutter. If it is determined that the shutter speed is a slow shutter, the processing proceeds to step S403, in which the time $T_s$ which is applied to the slow shutter is set as the stability determination time. On the other hand, if it is determined that the shutter speed is not a slow shutter, the processing proceeds to step S404, in which the time $T_f$ which is shorter than the $T_s$ applied to the slow shutter is set as the stability determination time. It is to be noted that the values set in step S403 and step S404 are each previously determined. This allows focusing control to be exercised in a stable manner, regardless of the shutter speed.

While the stability determination time is determined here by determining whether or not the shutter speed is a slow shutter, how to determine the stability determination time is not limited to this example. For example, a current shutter speed may be compared with a number of different predetermined values for more precise classification. In this case, the stability determination time is also previously prepared depending on the number of predetermined values for use in comparison.

Furthermore, the stability determination time can be set adaptively depending on the cycle of the face recognition processing in the face detection processing unit 116.

Consider a case in which face recognition processing is carried out utilizing the pattern recognition described above. In this case, in the face detection processing unit for extracting a face region of an object from an input image, image signals obtained from the image sensor are used as an input image, and this input image is correlated with a template of a predetermined size which represents a face image. Then, a matching result is generated which is a set of correlation values. Then, face candidates with larger correlation values are extracted from the matching result. In the face recognition processing here, a plurality of templates of predetermined sizes which represent face images is prepared, and each of the templates is correlated with an input image to calculate a matching result (to repeat scanning of the image signals at each size), thereby allowing faces of multiple sizes to be recognized. In addition, in a case in which it is desirable to recognize a larger number of faces, candidates with lower correlation values may be recognized as faces. However, the time for data processing is longer by just that much. Thus, depending on the size of a face to be recognized, etc., the number of times for scanning with respect to the image signals will vary, and the recognition processing time per scanning will also vary. Therefore, the longer the detection cycle for the face recognition processing is with respect to the cycle of the AF control, the smaller the number of times for determining whether or not a face is recognized in a stable manner is, and the more the reliability of determining whether or not a face is recognized in a stable manner is decreased. Accordingly, when the stability determination time is set as a longer period of time the longer the detection cycle of the face recognition processing, that is, the time required for face detection for one sensed image, focusing determination can be carried out in a stable manner for a recognized face.

Figure 5:
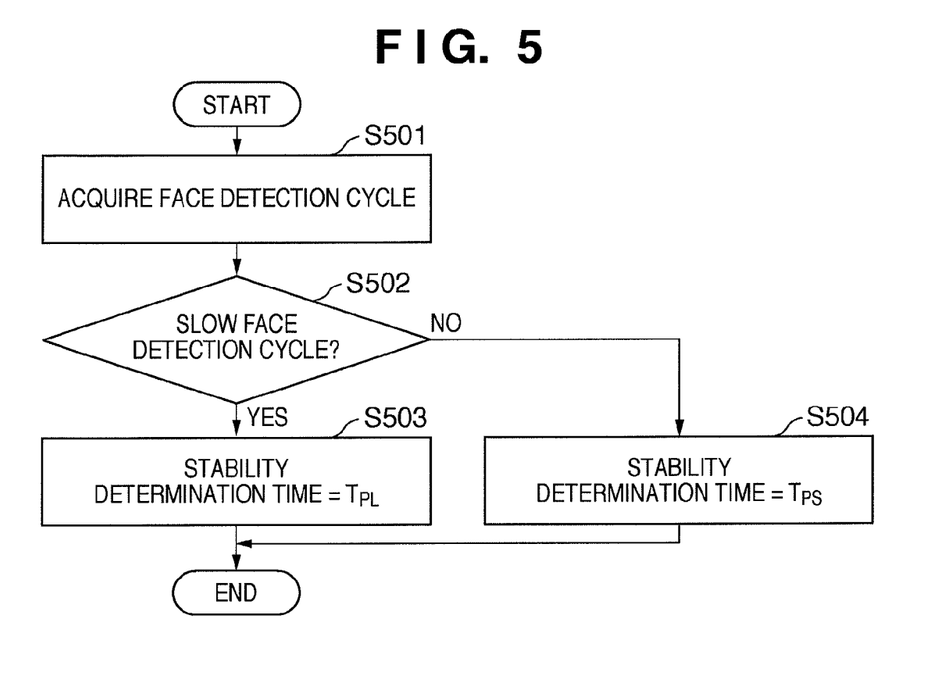
FIG. 5 is a flowchart showing an example of processing in which stability determination time is set depending on the cycle of face recognition processing.

FIG. 5 is a flowchart showing an example of processing for setting the stability determination time depending on the cycle of face recognition processing. The control unit 114 acquires, in step S501, the detection cycle of face recognition processing carried out by the face detection processing unit 116. For example, the control unit 114 acquires the recognition cycle of the face recognition processing from the face detection processing unit 116 in the same way as information such as the position, size, and reliability of face detection. In the next step S502, it is determined whether or not the acquired detection cycle is longer than a reference cycle. If it is determined that the detection cycle is longer than the reference cycle, the processing proceeds to step S503, in which the time $T_{PL}$ is set as the stability determination time. On the other hand, if it is determined that the detection cycle is shorter than the reference cycle, the processing proceeds to step S504, in which the time $T_{PS}$ which is shorter than the $T_{PL}$ set in step S503 is set as the stability determination time. It is to be noted that the reference cycle used in step S502 is previously determined. It is to be noted that the values set in step S503 and step S504 are each previously determined.

By setting the stability determination time in this way, regardless of the time required for the face recognition processing, it is possible to determine the state in which no face is recognized from the results of the face recognition processing carried out just a certain number of times, allowing a determination result to be obtained in a stable manner.

Furthermore, the stability determination time can be set depending on the shooting mode of the digital video camera 100.

More specifically, in a case in which stability determination time in common with a moving image shooting mode is set in a still image shooting mode for shooting still images, the photographer is discomfited by the inability to shoot a momentary scene desired by the photographer or to focus on a main subject. Therefore, it is necessary to shorten the stability determination time for shooting still images. Further, while shooting still images, the main person subject is stably positioned, and it is often the case that the compositions of the images have been decided. Therefore, it is likely that the state of face recognition and the state of no face recognition will not alternate frequently.

Figure 6:
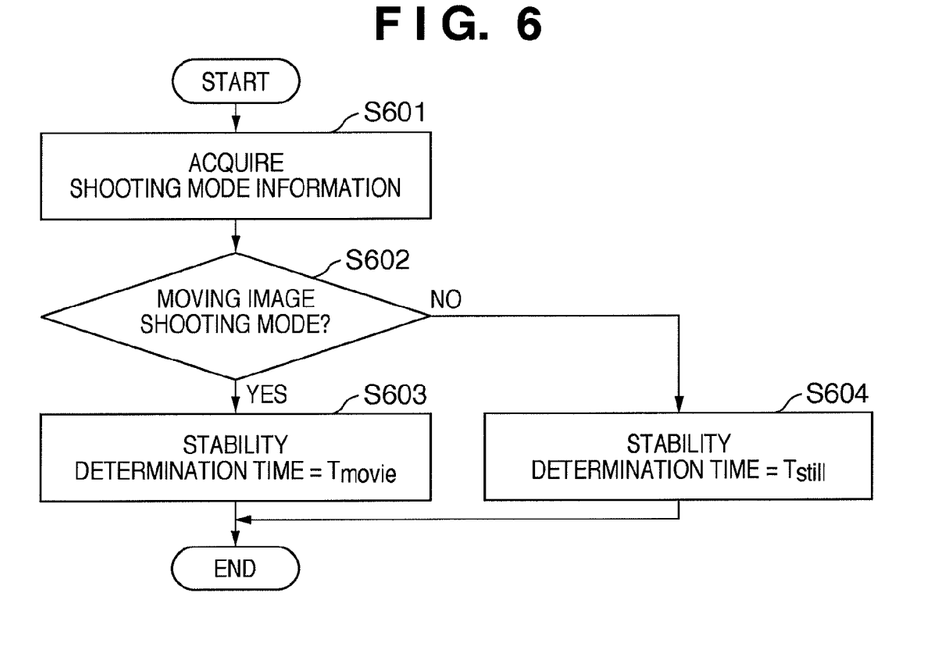
FIG. 6 is a flowchart showing an example of processing in which stability determination time is set depending on shooting mode.

FIG. 6 is a flowchart showing an example of processing for setting the stability determination time depending on the shooting mode. The control unit 114 acquires, in step S601, a current shooting mode, and in the next step S602, it is determined whether or not the current shooting mode is a moving image shooting mode. If it is determined that the shooting mode is a moving image shooting mode, the processing proceeds to step S603, in which the time $T_{movie}$ which is applied to a moving image mode is set as the stability determination time. On the other hand, if it is determined that the shooting mode is a still image shooting mode, the processing proceeds to step S604, in which the time $T_{still}$ which is shorter than the $T_{movie}$ set in step S603 is set as the stability determination time. This allows focusing control to be exercised in a stable manner, depending on a scene shot by the photographer or the conditions.

While the determination in step S602 is made by determining if the shooting mode of the digital video camera 100 is either a moving image shooting mode or a still image shooting mode, the present invention is not limited to this example. For example, a determination may be made by determining whether or not the shooting mode is a specific shooting mode, for example, a portrait mode for use in the case of photographing a person.

<Examples of Setting the AF Frame>

Figure 7A:
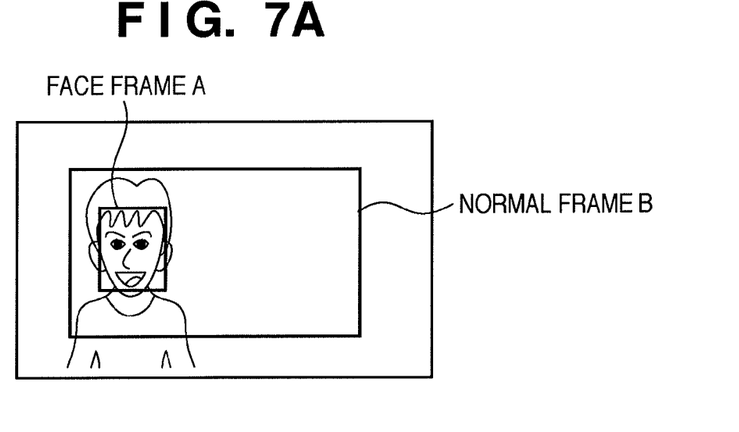
FIGS. 7A to 7C are diagrams illustrating examples of setting a face frame and normal frames.

Examples of setting the face frame and the normal frame will be described now with reference to FIGS. 7A to 7C. FIG. 7A shows an example in which a face frame A and a normal frame B are set in a sensed image. The normal frame B is set centering on the center of the sensed image, whereas the face frame A is set in the position subjected to face recognition.

Figure 7B:
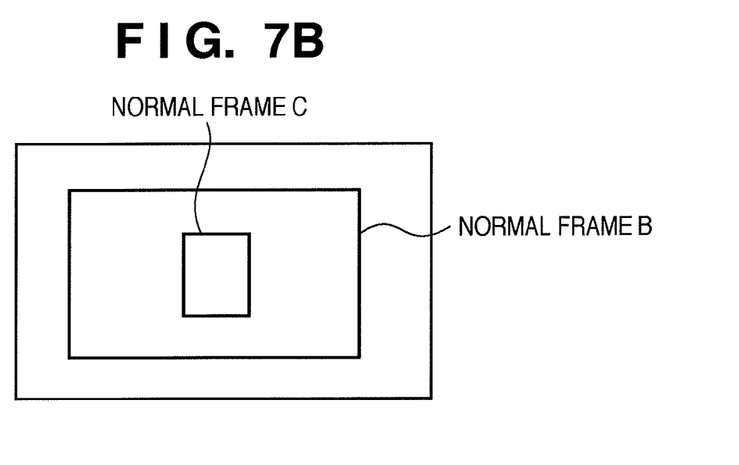

FIG. 7B is an example in the case of exercising TV-AF control using only normal frame(s). In the case here, in which only normal frame(s) are set in a sensed image, the face frame A can be simply deleted from the state exemplified in FIG. 7A to detect an AF evaluation value for only the normal frame B and then exercise TV-AF control. Besides this, considering that it is often the case that the photographer arranges a subject in the center of a sensed image, a normal frame C which is smaller than the normal frame B may be further set centering on the center of the image. In this case, AF evaluation values acquired from each of the normal frame B and the normal frame C are added to exercise TV-AF control.

Figure 7C:
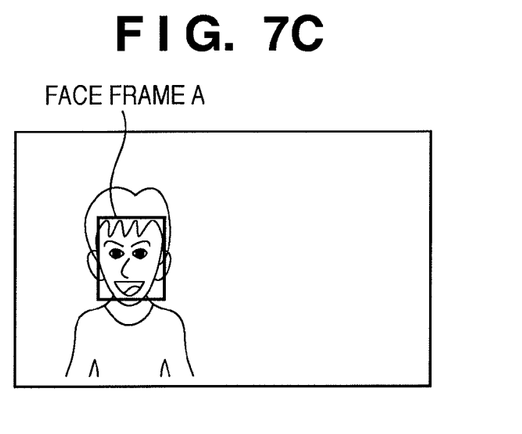

Furthermore, in a case in which it is determined in step S205 described above that a face is recognized in a stable manner, only a face frame A may be set as an AF frame in step S206, as exemplified in FIG. 7C. More specifically, an AF evaluation value is acquired from only the face frame A (step S207), and the AF evaluation value is used to exercise TV-AF control in accordance with step S213.

Second Embodiment

Next, a second embodiment according to the present invention will be described. In the second embodiment, in a case in which there are a number of faces recognized by face recognition processing, in contrast to the TV-AF control according to the first embodiment described above, the face with the highest priority (referred to as a main face) is determined from among the number of faces. Then, it is determined if TV-AF control is exercised using a face frame and a normal frame or if TV-AF control is exercised using only a normal frame, by determining whether or not the face determined as the main face is determined as the main face in a stable manner for a certain period of time.

Figure 8:
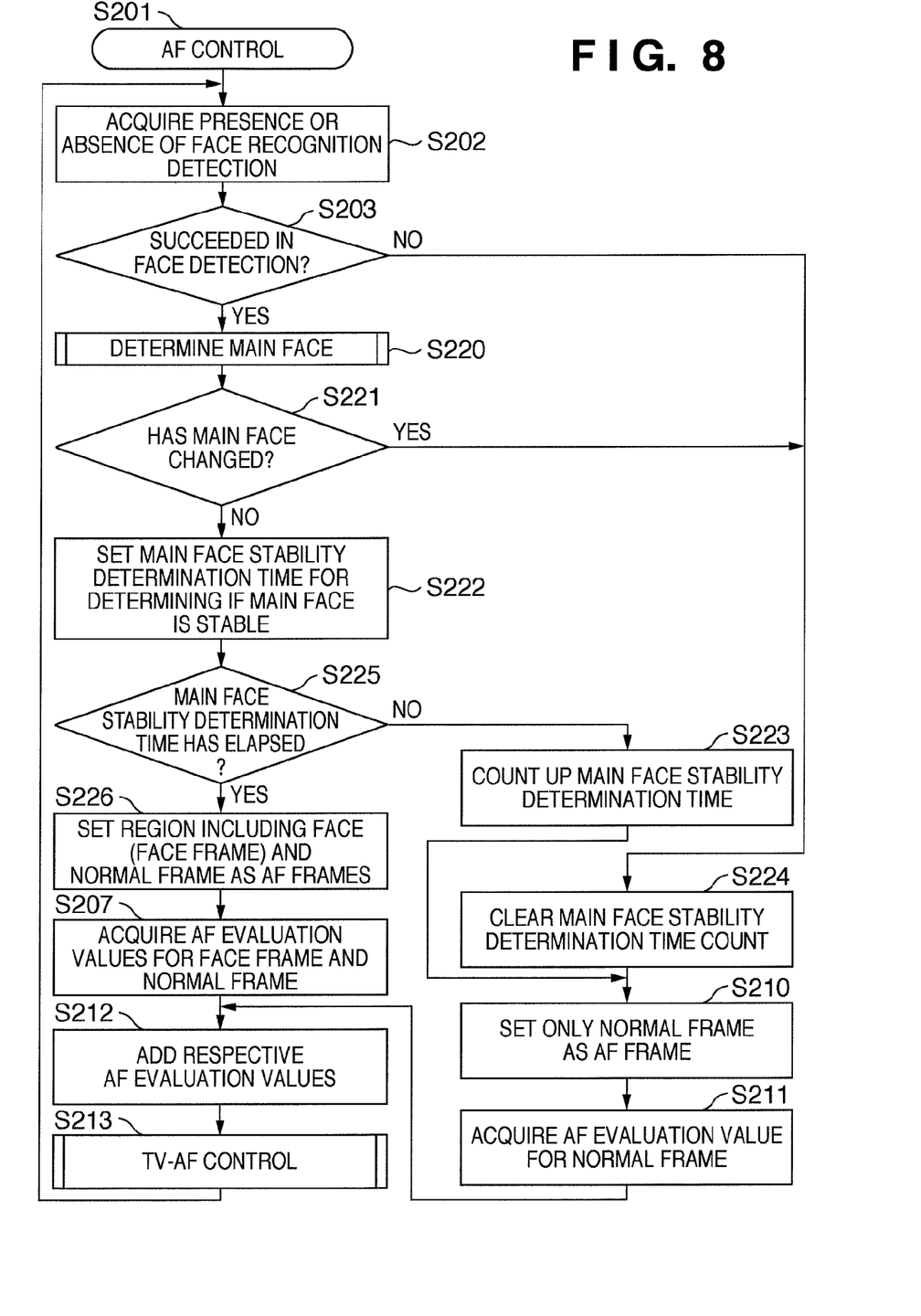
FIG. 8 is a flowchart showing an example of TV-AF control according to a second embodiment of the present invention.

FIG. 8 is a flowchart showing an example of TV-AF control according to the second embodiment of the present invention. In FIG. 8, the steps in common with FIG. 2 described above are denoted by the same reference numerals and detailed description thereof omitted. In addition, the processing in accordance with this flowchart of FIG. 8 is executed repeatedly, for example, on a reading cycle for image signals from the image sensor 106 for generating an image for one field, in the same way as the flowchart of FIG. 2 described above.

The control unit 114 starts the processing in step S201, the face detection processing unit 116 executes face recognition processing in the next step S202, and in step S203, it is determined whether or not the step has succeeded in face recognition. If it is determined that the step has failed in face detection, the processing proceeds to step S224, in which main face recognition duration which is counted up in step S223 described below is cleared. Then, the processing proceeds to step S210, in which only a normal frame is set for the AF gate 112 as an AF frame, then in the next step S211, an AF evaluation value is acquired from the normal frame, and the processing proceeds to step S212.

On the other hand, if it is determined in step S203 described above that the step has succeeded in face recognition, the processing proceeds to step S220. In step S220, main face determination processing is carried out in which the main face considered to have the highest priority is determined from recognized faces. This main face determination processing will be described below in detail.

When the main face is set in step S220, it is determined in the next step S221 whether or not the main face in this main face determination processing has changed as compared with the main face in the previous main face determination processing. If it is determined that the main face has changed, the processing proceeds to step S224, in which the main face recognition duration is cleared.

On the other hand, if the main face has not changed between the previous main face determination processing and the current main face determination processing, the processing proceeds to step S222. In step S222, main face stability determination time for determining whether or not the main face is recognized in a stable manner is set. This main face stability determination time is set, for example, with a repeat cycle of the flowchart of FIG. 8 as a unit, in the same way as in the stability determination time described above.

It is to be noted that a predetermined value can be used for this main face stability determination time. Besides this, the main face stability determination time can be set depending on the focal length or shutter speed of the photographing optical system, the face detection cycle in the face recognition processing, the shooting mode of the digital video camera 100, etc., as described in the first embodiment described above with reference to FIGS. 3 to 6.

After the main face stability determination time is set in step S222, the processing proceeds to step S225, in which it is determined whether or not the time elapsing from setting the main face exceeds the main face stability determination time. More specifically, it is determined in step S225 whether or not the main face recognition duration exceeds the main face stability determination time. If it is determined that the main face recognition duration does not exceed the main face stability determination time, the processing proceeds to step S223, in which the main face recognition duration is counted up. Then, the processing proceeds to step S210.

On the other hand, if it is determined in step S225 that the main face recognition duration exceeds the main face stability determination time, the processing proceeds to step S226. In step S226, a face frame corresponding to the main face and a normal frame including the face frame and centering on the center of a sensed image are each set for the AF gate 112 as AF frames. It is to be noted that the face frame corresponding to the main face can be obtained on the basis of positional information on the image from which the face is recognized in accordance with face recognition processing carried out by the face detection processing unit 116, and of information on the main face set in step S220 described above. Then, in the next step S207, the control unit 114 acquires from the AF signal processing unit 113 AF evaluation values for each of the face frame and the normal frame, and the processing then proceeds to step S212.

In step S212, the AF evaluation values acquired from each set AF frame are added to generate an AF evaluation value for use in TV-AF control. At this point, the AF evaluation value acquired from the face frame can be subjected to weighting. In the next step S213, the AF evaluation value generated in step S212 is used to execute TV-AF control. After the execution of the TV-AF control in step S213, the processing returns to step S202.

It is to be noted that in the second embodiment as well, an indication representing the face frame can be displayed on the display unit 109 when the face frame is set for the main face in step S226, in the same way as in the first embodiment described above. In addition, this indication representing the face frame will be erased when an AF frame is set for only a normal frame in step S210, in a case in which the step has next time failed in face recognition (step S203) or the main face has changed to a different face (step S221).

Furthermore, AF frame setting in step S226 and step S210 is also carried out in the same way as described in the first embodiment described above. More specifically, in step S226, a face frame A corresponding to a main face and a normal frame B including the face frame A may be set as exemplified in FIG. 7A, or only a face frame A corresponding to a main face may be set as exemplified in FIG. 7C. Furthermore, in step S210, only the face frame A may be simply deleted from the state exemplified in FIG. 7A to leave only the normal frame B as exemplified in FIG. 7B, or a normal frame C which is smaller than the normal frame B may be further set.

As described above, in the second embodiment according to the present invention, the face with the highest priority is set as a main face from among faces recognized in the face recognition processing, and it is determined whether or not this main face is detected in a stable manner for a predetermined period of time without changing to another face. Therefore, even if a number of faces are recognized for one sensed image, the face frame can be prevented from switching among the number of faces, allowing focusing control to be exercised in a stable manner.

Figure 9:
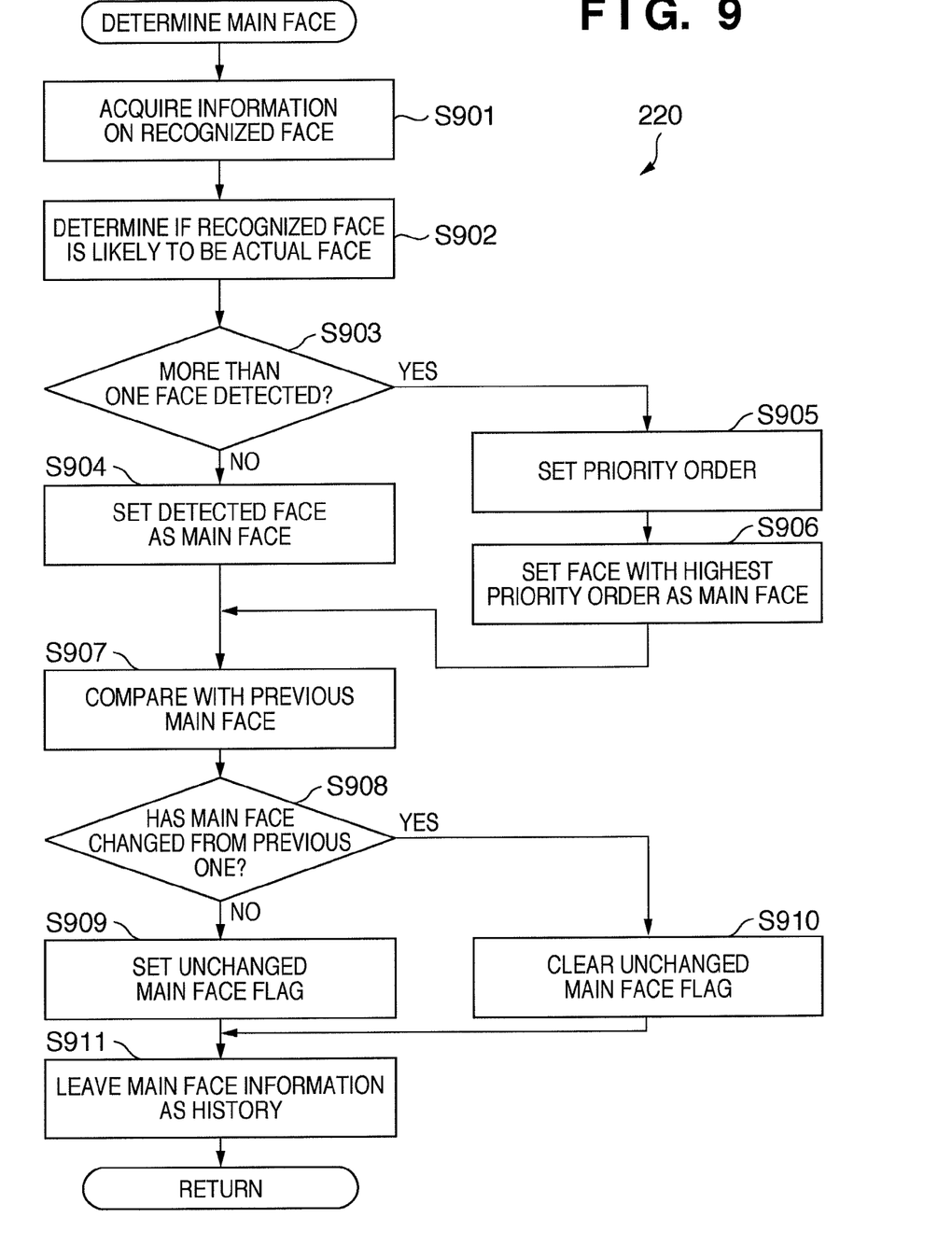
FIG. 9 is a flowchart showing an example of processing for determining a main face.

FIG. 9 is a flowchart showing an example of processing for the main face determination executed in step S220 described above. First, in step S901, information on the faces recognized in the face recognition processing is acquired, where the face information refers to, for example, the positions and sizes of the recognized faces on the sensed image and the reliability of the face recognition processing. Next, in step S902, it is determined if the faces recognized in the face recognition processing are likely to be actual faces. This determination is made mainly from the reliability contained in the face information, and it is highly likely that the face with lower reliability, which may actually not be a face, is falsely detected as a face. Therefore, from among the detected faces, the faces with reliability higher than a predetermined value are determined as reliable faces, whereas the faces with reliability lower than the predetermined value are removed from the recognized faces.

In the next step S903, it is determined whether or not more than one face is recognized in the sensed image. If it is determined that only one face is recognized, the processing proceeds to step S904, in which the only one face is determined as a main face. Then, the processing proceeds to step S907.

On the other hand, if it is determined that more than one face is recognized in the sensed image, the processing proceeds to step S905. In step S905, the priory order is set for the more than one recognized face. The priority order is set from the face estimated to be desired as a main person subject by the photographer among the more than one face.

As a first example, the priority order is set from the face nearest the center of the image, on the basis of the positions of each of the more than one face in the sensed image. As a second example, the priority order is set from the face of the largest size in the sensed image with respect to each of the more than one face. As a third example, the priority order is set from the face with the highest reliability in the face recognition processing with respect to each of the more than one face. The priority order setting is not limited to these first to third examples. In addition, these first to third examples may be appropriately combined to carry out the priority order setting.

In the next step S906, as a result of the priority order setting for the more than one face in step S905, the face with the highest priority order is set as a main face. Then, the processing proceeds to S907.

In step S907, the main face set in the previous main face determination processing is compared with the main face set in the current main face determination process. For example, the main face set in the previous main face determination processing is compared with the main face set in the current main face determination process in terms of position and size in the sensed image. Then, in the next step S908, it is determined whether or not a face which is different from the face set as a main face in the previous main face determination processing is set as a main face in the current main face determination processing.

Whether or not the main face varies between the previous time and this time is determined on the basis of information on the face set as the main face. As a first example, on the basis of positional information of the face in the sensed image, it is possible to determine that the main face remains unchanged if the difference between the position of the previous main face and the position of this main face is a predetermined value or less. As a second example, on the basis of the size of the face in the sensed image, it is possible to determine that the main face remains unchanged if the difference between the size of the previous main face and the size of this main face is a predetermined value or less. As a third example, on the basis of the reliability of the face in the face recognition processing, it is possible to determined that the main face remains unchanged if the difference between the reliability of the previous main face and the reliability of this main face is a predetermined value or less.

It is to be noted that the method for determining whether or not the main face varies between the previous time and this time is not limited to these first to third examples. In addition, these first to third examples may be appropriately combined to carry out the determination.

If it is determined in step S908 that the main face set in this main face determination processing remains unchanged with respect to the main face set in the previous main face determination processing, the processing proceeds to step S909, where an unchanged main face flag is set. On the other hand, if it is determined that this main face has changed with respect to the previous main face, the processing proceeds to step S910, in which an unchanged main face flag is cleared. In step S221 in the flowchart of FIG. 8, it is determined on the basis of the unchanged main face flag whether or not the main face has changed.

After the processing in step S908 or step S909, the processing proceeds to step S911, in which the information on the main face set in this main face determination processing is stored in, for example, the RAM of the control unit 114 to be left as a history. In the next main face determination, the information on the main face from this main face determination processing, which is left as a history, is used as information on the previous main face. When this main face information is left as a history, the series of main face determination processing is completed, and the processing proceeds to step S221 in the flowchart of FIG. 8.

While the face frame is described as a frame set for the main face in the foregoing, how to set the face frame is not limited to this example. For example, the face frame may be set for all of the faces recognized in step S202 in the flowchart of FIG. 8. In this case, it is conceivable that when a main face is determined in step S220 or later, the face frames set for the faces other than the main face will be deleted.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-272349, filed on Oct. 22, 2008 which is hereby incorporated by reference herein in its entirety.

What is claimed is:

1. An auto focusing apparatus comprising:
   a detection unit configured to detect a specific object from image signals periodically supplied;
   a determination unit configured to determine whether or not the specific object has been consecutively detected;
   a setting unit configured to set a first area corresponding to the specific object detected by the detection unit and a second area which is different from the first area until the determination unit determines that that specific object has been consecutively detected; and
   a focusing unit configured to perform focusing control by an imaging optical system based on image signals,
   wherein the focusing unit starts the focusing control based on the image signal in the second area until the determination unit determines that the specific object has been consecutively detected, and starts the focusing control based on the image signals in the first area in a case where the determination unit determines that the specific object has been consecutively detected.

2. The auto focusing apparatus according to claim 1, wherein, in a case where the specific object has been consecutively detected for more than a predetermined period of time, the determination unit determines that the specific object has been consecutively detected.

3. The auto focusing apparatus according to claim 1, wherein, in a case where the specific object has been consecutively detected more than a predetermined number of times, the determination unit determines that the specific object has been consecutively detected.

4. The auto focusing apparatus according to claim 1, wherein the detection unit detects faces in images.

5. The auto focusing apparatus according to claim 4, wherein, in a case in which the detection unit detects a plurality of faces from an image of the image signals, the focusing unit performs focusing control depending on a period of time for which a face with the highest priority order among the number of faces is consecutively detected from the image signals by the detection unit.

6. The auto focusing apparatus according to claim 5, wherein the priority order is determined depending on at least one of positions of the plurality of faces, sizes of the plurality of faces, and reliability of a detection result from the detection unit, and is higher as the position is closer to the center of the sensed image, higher as the size is larger, and higher as the reliability of the detection result from the detection unit increases.

7. The auto focusing apparatus according to claim 1, wherein the setting unit sets the second area centering on the center of the sensed image.

8. The auto focusing apparatus according to claim 2, wherein the determination unit changes the predetermined period of time depending upon a time required to detect the specific object from the image signals by the detection unit.

9. The auto focusing apparatus according to claim 1, wherein the detection unit repeatedly detects the specific object at a signal read period for reading an image sensing unit to generate image signals of one field.

10. The auto focusing apparatus according to claim 2, wherein the determination unit sets a longer period of time as the predetermined period of time in a still image mode than in a moving image mode.

11. The auto focusing apparatus according to claim 3, wherein the predetermined number of times is greater in a still image mode than in a moving image mode.

12. The auto focusing apparatus according to claim 1, further comprising a display control unit adapted to control an indication on a display device,
   wherein the display control unit controls to display on the display device an indication indicating the first area together with an image of the image signals in a case where the determination unit determines that the specific object has been consecutively detected.

13. The auto focusing apparatus according to claim 1, wherein the focusing unit performs focusing control based on the image signals in the first area and a third area which is different from the first area in a case where the determination unit determines that the specific object has been consecutively detected.

14. The auto focusing apparatus according to claim 13, wherein the third area is larger than the first area.

15. An image sensing apparatus comprising:
   an image sensing unit configured to sense incident light through an imaging optical system and output the light as the image signals;
   a record unit adapted to record, on a record medium, a moving image based on the image signals obtained using the image sensing unit; and
   the auto focusing apparatus according to claim 1.

16. The auto focusing apparatus according to claim 3, wherein the predetermined number of times is variable.

17. The auto focusing apparatus according to claim 16, wherein the predetermined number of times is set depending on shooting mode.

18. The auto focusing apparatus according to claim 17, wherein the predetermined number of times is greater in a still image mode than in a moving image mode.

19. An auto focusing method comprising:
a detection step configured to detect a specific object from image signals periodically supplied;
a determination step of determining whether or not the specific object has been consecutively detected;
a setting step configured to set a first area corresponding to the specific object detected by the detection step and a second area which is different from the first area until the determination step determines that the specific object has been consecutively detected; and
a focusing step configured to perform focusing control by an imaging optical system based on image signals,
wherein, in the focusing step, focusing control based on the image signal in the second area is performed until the determination unit determines that the specific object has been consecutively detected, and the focusing control based on the image signals in the first area is started in a case where the determination step determines that the specific object has been consecutively detected.

20. An auto focusing apparatus comprising:
a detection unit configured to detect specific object from image signals periodically supplied;
a determination unit configured to determine whether or not the specific object has been consecutively detected;
a setting unit configured to set a first area corresponding to the specific object detected by the detection unit and a second area which is different from the first area; and
a focusing unit configured to acquire a focus signal based on image signals in one of the first area and the second area set by the setting unit, and perform focusing control of a photographing by an imaging optical system based on the focus signal,
wherein the setting unit sets the second area until the determination unit determines that the specific object has been consecutively detected and starts setting the first area in a case where the determination unit determines that the specific object has been consecutively detected, and
wherein the focusing unit performs focusing control based on the image signal in the second area until the determination unit determines that the specific object has been consecutively detected.

21. The auto focusing apparatus according to claim 20, wherein, in a case where the specific object has been consecutively detected for more than a predetermined period of time, the determination unit determines that the specific object has been consecutively detected.

22. The auto focusing apparatus according to claim 20, wherein, in a case where the specific object has been consecutively detected more than a predetermined number of times, the determination unit determines that the specific object has been consecutively detected.

23. The auto focusing apparatus according to claim 20, wherein the detection unit detects faces in images.

24. The auto focusing apparatus according to claim 23, wherein, in a case in which the detection unit detects a plurality of faces from an image of the image signals, the focusing unit performs focusing control in the first area depending on a period of time for which a face with the highest priority order among the number of faces is consecutively detected from the image signals by the detection unit.

25. The auto focusing apparatus according to claim 24, wherein the priority order is determined depending on at least one of positions of the plurality of faces, sizes of the plurality of faces, and reliability of a detection result from the detection unit, and is higher as the position is closer to the center of the sensed image, higher as the size is larger, and higher as the reliability of the detection result from the detection unit increases.

26. The auto focusing apparatus according to claim 20, wherein the setting unit sets the second area centering on the center of the sensed image.

27. The auto focusing apparatus according to claim 21, wherein the determination unit changes the predetermined period of time depending upon a time required to detect the specific object from the image signals by the detection unit.

28. The auto focusing apparatus according to claim 20, wherein the detection unit repeatedly detects the specific object at a signal read period for reading an image sensing unit to generate image signals of one field.

29. The auto focusing apparatus according to claim 21, wherein the determination unit sets a longer period of time as the predetermined period of time in a still image mode than in a moving image mode.

30. The auto focusing apparatus according to claim 22, wherein the predetermined number of times is greater in a still image mode than in a moving image mode.

31. The auto focusing apparatus according to claim 20, further comprising a display control unit adapted to control an indication on a display device,
wherein the display control unit controls to display on the display device an indication indicating the first area together with an image of the image signals in a case where the determination unit determines that the specific object has been consecutively detected.

32. The auto focusing apparatus according to claim 20, wherein the focusing unit performs focusing control based on the image signals in the first area and a third area which is different from the first area in a case where the determination unit determines that the specific object has been consecutively detected.

33. The auto focusing apparatus according to claim 32, wherein the third area is larger than the first area.

34. An image sensing apparatus comprising:
an image sensing unit configured to sense incident light through the imaging optical system and output the light as the image signals;
a record unit adapted to record, on a record medium, an image based on the image signals obtained using the image sensing unit; and
the auto focusing apparatus according to claim 20.

35. The auto focusing apparatus according to claim 22, wherein the predetermined number of times is variable.

36. The auto focusing apparatus according to claim 35, wherein the predetermined number of times is set depending on shooting mode.

37. The auto focusing apparatus according to claim 36, wherein the predetermined number of times is greater in a still image mode than in a moving image mode.

38. An auto focusing method comprising:
a detection step configured to detect a specific object from image signals periodically supplied;
a determination step of determining whether or not the specific object has been consecutively detected;
a setting step configured to set a first area corresponding to the specific object detected by the detection step and a second area which is different from the first area; and a focusing step configured to acquire a focus signal based on image signals in one of the first area and the second area set in the setting step, and perform focusing control of a photographing by an imaging optical system based on the focus signal, wherein the setting step starts setting the first area in a case where the determination step determines that the specific object has been consecutively detected, and starts setting the first area in a case where the determination step determines that the specific object has been consecutively detected.

39. An auto focusing apparatus comprising:

a detection unit configured to detect a specific object from image signals periodically supplied;

a determination unit configured to determine whether or not the specific object has been consecutively detected;

a setting unit configured to set a first area corresponding to the specific object detected by the detection unit and a second area which is different from the first area until the determination unit determines that the specific object has been consecutively detected; and a focusing unit configured to acquire a focus signal based on image signals in one of the first area and the second area set by the setting unit, and perform focusing control by an imaging optical system based on the focus signal, wherein the focusing unit does not perform focusing control on the image signals in the second area, and does not perform focusing control by the imaging optical system based on the image signals in the first area until the determination unit determines that the specific object has been consecutively detected.

40. An auto focusing apparatus comprising:

a detection unit configured to detect a specific object from image signals periodically supplied;

a determination unit configured to determine whether or not the specific object has been consecutively detected;

a setting unit configured to set a first area corresponding to the specific object detected by the detection unit and a second area which is different from the first area; and a focusing unit configured to acquire a focus signal based on image signals in one of the first area and the second area set by the setting unit, and perform focusing control by an imaging optical system based on the focus signal, wherein the setting unit does not set the first area corresponding to the specific object until the determination unit determines that the specific object has been consecutively detected.

41. An auto focusing apparatus comprising:

a detection unit configured to detect a specific object from image signals periodically supplied;

a setting unit configured to set a first area corresponding to the specific object detected by the detection unit and a second area which is different from the first area; and a focusing unit configured to acquire a focus signal based on image signals in one of the first area and the second area set by the setting unit, and perform focusing control by an imaging optical system based on the focus signal, wherein the setting unit sets the first area in response to that a period of time when the specific object has been consecutively detected from the image signals by the detection unit exceeds a threshold, and sets the second area until the period of time exceeds the threshold.

42. An auto focusing apparatus comprising:

a detection unit configured to detect a specific object from image signals periodically supplied;

a setting unit configured to set a first area corresponding to the specific object detected by the detection unit and a second area which is different from the first area; and a focusing unit configured to acquire a focus signal based on image signals in one of the first area and the second area set by the setting unit, and perform focusing control by an imaging optical system based on the focus signal, wherein the focusing unit performs the focusing control on the basis of the image signals in the second area and does not perform the focusing control on the basis of the image signals in the first area until it is determined that the specific object is consecutively detected for more than a predetermined period of time.

43. An auto focusing apparatus comprising:

a detection unit configured to detect a specific object from image signals periodically supplied;

a setting unit configured to set a first area corresponding to the specific object detected by the detection unit and a second area which is different from the first area; and a focusing unit configured to acquire a focus signal based on image signals in one of the first area and the second area set by the setting unit, and perform focusing control by an imaging optical system based on the focus signal, wherein the setting unit does not set the first area until it is determined that the specific object is consecutively detected for more than a predetermined period of time.

44. An auto focusing apparatus comprising:

a detection unit configured to detect a specific object from image signals periodically supplied;

a setting unit configured to set a first area corresponding to the specific object detected by the detection unit and a second area which is different from the first area; and a focusing unit configured to acquire a focus signal based on image signals in one of the first area and the second area set by the setting unit, and perform focusing control by an imaging optical system based on the focus signal, wherein the focusing unit performs the focusing control on the basis of the image signals in the first area in a case where the specific object has been consecutively detected more than a predetermined number of times, and performs the focusing control on the basis of the image signals in the second area until the specific object has been consecutively detected more than the predetermined number of times.

45. An auto focusing apparatus comprising:

a detection unit configured to detect a specific object from image signals periodically supplied;

a setting unit configured to set a first area corresponding to the specific object detected by the detection unit and a second area which is different from the first area; and a focusing unit configured to acquire a focus signal based on image signals in one of the first area and the second area set by the setting unit, and perform focusing control by an imaging optical system based on the focus signal, wherein the setting unit sets the first area corresponding to the specific object in a case where the specific object has been consecutively detected more than a predetermined number of times, and sets the second area until the specific object has been consecutively detected more than the predetermined number of times.

46. An auto focusing apparatus comprising:

a detection unit configured to detect a specific object from image signals periodically supplied;

a setting unit configured to set a first area corresponding to the specific object detected by the detection unit and a second area which is different from the first area; and a focusing unit configured to acquire a focus signal based on image signals in one of the first area and the second area set by the setting unit, and perform focusing control by an imaging optical system based on the focus signal, wherein the focusing unit does not perform focusing control based on the image signals in the first area and perform focusing control based on the image signals in the second area until the specific object is consecutively detected more than a predetermined number of times.

47. An auto focusing apparatus comprising:

a detection unit configured to detect a specific object from image signals periodically supplied;

a setting unit configured to set a first area corresponding to the specific object detected by the detection unit and a second area which is different from the first area; and a focusing unit configured to acquire a focus signal based on image signals in one of the first area and the second area set by the setting unit, and perform focusing control by an imaging optical system based on the focus signal, wherein the setting unit sets the second area and does not set the first area corresponding to the specific object until specific object is consecutively detected more than a predetermined number of times.

48. An auto focusing apparatus comprising:

a detection unit configured to detect a specific object from image signals periodically supplied;

a determination unit configured to determine whether or not the specific object has been stably detected;

a setting unit configured to set a first area corresponding to the specific object detected by the detection unit and a second area which is different from the first area until the determination unit determines that the specific object has been stably detected; and a focusing unit configured to perform focusing control by an imaging optical system based on image signals, wherein the focusing unit performs focusing control based on the image signals in the second area until the determination unit determines that the specific object has been stably detected, and starts the focusing control based on the image signals in the first area in a case where the determination unit determines that the specific object has been stably detected.

49. The auto focusing apparatus according to claim 48, wherein the detection unit detects a face in image.

50. An auto focusing method comprising:

a detection step configured to detect a specific object from image signals periodically supplied;

a determination step of determining whether or not the specific object has been stably detected;

a setting step configured to set a first area corresponding to the specific object detected by the detection step and a second area which is different from the first area until the determination step determines that the specific object has been stably detected; and a focusing step configured to perform focusing control by an imaging optical system based on image signals, wherein, in the focusing step, the focusing control based on the image signals in the second area is performed until the determination step determines that the specific object has been stably detected, and the focusing control based on the image signals in the first area is started in a case where the determination step determines that the specific object has been stably detected.

51. An auto focusing apparatus comprising:

a detection unit configured to detect a specific object from image signals periodically supplied;

a setting unit configured to set a first area corresponding to the specific object detection by the detection unit and a second area which is different from the first area; and a focusing unit configured to acquire a focus signal based on image signals in on of the first area and the second area set by the setting unit, and perform focusing control using an imaging optical system based on the focus signal, wherein the focusing unit performs the focusing control on the basis of the image signals in the first area in a case where the specific object has been detected more than a predetermined number of times, and performs the focusing control on the basis of the image signals in the second area until the specific object has been detected more than the predetermined number of times.

52. An auto focusing apparatus comprising:

a detection unit configured to detect a specific object from image signals periodically supplied;

a setting unit configured to set a first area corresponding to the specific object detected by the detection unit and a second area which is different from the first area; and a focusing unit configured to acquire a focus signal based on image signals in one of the first area and the second area set by the setting unit, and perform focusing control using an imaging optical system based on the focus signal, wherein the setting unit sets the first area in a case where the specific object has been detected more than a predetermined number of times, and sets the second area until the specific object has been detected more than the predetermined number of times.

53. An auto focusing apparatus comprising:

a detection unit configured to detect a specific object from image signals periodically supplied;

a setting unit configured to set a first area corresponding to the specific object detected by the detection unit and a second area which is different from the first area; and a focusing unit configured to acquire a focus signal based on image signals in one of the first area and the second area set by the setting unit, and perform focusing control using an imaging optical system based on the focus signal, wherein the focusing unit does not perform focusing control on the basis of the image signals in the first area and perform focusing control on the basis of the image signals in the second area until the specific object is detected more than a predetermined number of times.

54. An auto focusing apparatus comprising:

a detection unit configured to detect a specific object from image signals periodically supplied;

a setting unit configured to set a first area corresponding to the specific object detected by the detection unit and a second area which is different from the first area; and a focusing unit configured to acquire a focus signal based on image signals in one of the first area and the second area set by the setting unit; and perform focusing control using an imaging optical system based on the focus signal, which the setting unit sets the second area and does not set the first area until the specific object is detected more than a predetermined number if times.

* * * * *